2,756,240
2-CHLORODIOXENE

Melvin J. Astle, Shaker Heights, and William C. Gergel, Cleveland Heights, Ohio, assignors to Olin Mathieson Chemical Corporation, a corporation of Virginia No Drawing. Application October 26, 1954, Serial No. 464,909

6 Claims. (Cl. 260—340.6)

This invention relates to a novel composition of matter, namely monomeric 2-chlorodioxene, and to the method of producing it by the dehydrochlorination of 2,3-dichlorodioxane.

2-chlorodioxene is obtained according to the process of the present invention by heating 2,3-dichlorodioxane in the absence of any added catalyst or reactant to remove hydrogen chloride and the resulting 2-chlorodioxene is recovered. The reaction is expressed by the following equation:

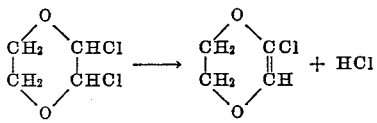

The preferred method contemplates refluxing 2,3-dichlorodioxane, continuously removing chlorodioxene and hydrogen chloride from the top of the column. Only small amounts of tarry by-products are formed under these conditions and the yields of chlorodioxene are satisfactory. Somewhat lower yields are obtained by refluxing the entire mixture except for the removal of hydrogen chloride and then fractionating the residual liquid mixture.

Methods of dehydrochlorination using various bases including sodium carbonate, sodium bicarbonate, alcoholic sodium hydroxide, pyridine or a tertiary amine type of anion exchange resin are unsatisfactory for preparing 2-chlorodioxene. A reaction usually occurs but the product is a highly viscous tar and no monomeric 2-chlorodioxene is obtained.

The overhead distillate using the preferred method of this invention consists primarily of 2-chlorodioxene containing dissolved hydrogen chloride. The latter can be removed by any convenient method but preferably by purging with nitrogen or other inert gas and redistilling. In the redistillation it is advantageous to add a small amount of high boiling inert solvent, for example, a polyethylene glycol dialkyl ether. Tetraethylene glycol dimethyl ether having a boiling point of 275° C. is particularly suitable. Use of the high boiling solvent reduces the amount of decomposition and polymerization of the 2-chlorodioxene. The high boiling inert solvent can also be added in the initial treatment of 2,3-dichlorodioxane.

2-chlorodioxene is a very reactive intermediate and is capable of polymerizing and forming co-polymers. The chlorine atom is very reactive with alcohols, phenols, amines and other substances furnishing hydrogen. 2-chlorodioxene is also useful as an intermediate in the preparation of 2-p-dioxanone by hydrolysis using aqueous sodium hydroxide and potassium oleate as an emulsifier.

Example I

Pure 2,3-dichloro-1,4-dioxane (978.2 grams or 6.23 moles) was charged into a one-liter thermowell flask which was fitted with a 20-plate Oldershaw column. On heating to 186° C., hydrogen chloride began to be evolved. During 4.5 hours of refluxing, 554 milliliters (749.1 grams) of overhead vapor was separately condensed and collected. A residue of 84.2 grams remained. The crude chlorodioxene condensate, containing dissolved hydrogen chloride, was distilled through a 14-inch glass column packed with ⅛-inch glass helices. The yield of pure chlorodioxene was 572.0 grams or 76.5 per cent of the theoretical based on the 2,3-dichloro-1,4-dioxane charged. The boiling range was 145–147° C. at atmospheric pressure and the index of refraction at 25° C. was 1.466.

Example II

Pure 2,3-dichloro-1,4-dioxane (953.8 grams or 6.07 moles) and 100 milliliters of tetraethylene glycol dimethyl ether were heated, refluxing the 2,3-dichlorodioxane, in a one-liter thermowell flask fitted with a 20-plate Oldershaw column. The crude chlorodioxene distillate amounted to 469 milliliters or 614.9 grams. This represents 84.4 per cent of theory based on the dichlorodioxene charged. The residue amounted to 43.1 grams. The crude chlorodioxene was distilled through a 30-inch column packed with ¼-inch glass helices. Tetraethylene glycol dimethyl ether (100 milliliters) was added as a heel. A yield of 371 milliliters or 479.4 grams of pure chlorodioxene, representing 65.26 per cent of theory, was collected. The boiling range was 145°–147° C. at atmospheric pressure and the index of refraction at 25° C. was 1.466.

Example III

Pure 2,3-dichloro-1,4-dioxane (1921.9 grams or 12.24 moles) was heated in a two-liter thermowell flask fitted with a 20-plate Oldershaw column. Crude chlorodioxene amounting to 1072 milliliters or 1431.4 grams was collected overhead. The residue amounted to 189.9 grams. The crude chlorodioxene, together with 100 milliliters of tetraethylene glycol dimethyl ether was distilled through a 14-inch column packed with ⅛-inch helices. Pure chlorodioxene amounting to 853 milliliters or 973.8 grams representing a yield of 65 per cent, was collected over a boiling range of 145°–148° C. It had a refractive index at 25° C. of 1.466.

|  | C, Per-cent | H, Per-cent | Cl, Per-cent | Mol. Wt. | Bromine Number |
|---|---|---|---|---|---|
| Calculated for C₄H₅O₂Cl | 39.8 | 4.1 | 29.7 | 120.5 | 133 |
| Found | 38.83 | 4.25 | 31.85 | 117 | 133 |
|  |  |  | 31.64 | 120 | 131 |

Example IV

The 2-chlorodioxene prepared as described in any of the preceding examples is useful as an intermediate in the preparation of 2-p-dioxanone which in turn is useful, for example, for the preparation of copolymers with acrylonitrile or as a solvent or plasticizer as described in U. S. Patent 2,631,989. The 2-p-dioxanone was prepared as follows:

An aqueous solution of 22 grams of sodium hydroxide and 0.5 gram of potassium oleate in 200 milliliters of boiling water was cooled to about 70° C. and placed under a reflux condenser. During a period of 45 minutes, a total of 60 grams (0.5 mole) of 2-chlorodioxene was added slowly through the condenser. The exothermic reaction maintained the reaction mixture between 80 and 100° C. After cooling and standing overnight, the slightly acidic solution was extracted with ethyl ether, made slightly alkaline by the addition of caustic and again extracted with ether. The combined ether extracts were evaporated to about 50 milliliters and cooled in Dry Ice. The solid 2-p-dioxanone which separated was removed by filtration and air dried. It melted at 26–37° C. According to Palomaa et al., Ber. 65B, 923–5 (1932), 2-p-dioxanone when pure melts sharply at 26.7° C. but the melting point rises on standing due to gradual polymerization.

We claim:
1. 2-chlorodioxene.
2. A process for preparing 2-chlorodioxene which comprises heating 2,3-dichlorodioxane to a temperature sufficient to form hydrogen chloride and 2-chlorodioxene, separating hydrogen chloride evolved, and recovering 2-chlorodioxene.
3. A process according to claim 2 in which the 2,3-dichlorodioxane is refluxed during the heating thereof, whereby 2-chlorodioxene is separated with the hydrogen chloride evolved and is recovered as distillate.
4. A process according to claim 2 in which the 2,3-dichlorodioxane is heated in the presence of a high-boiling inert solvent therefor.
5. A process according to claim 2 in which the 2,3-dichlorodioxane is heated in the presence of a polyethylene glycol dialkyl ether.
6. A process according to claim 2 in which the 2,3-dichlorodioxane is heated in the presence of tetraethylene glycol dimethyl ether.

References Cited in the file of this patent

Summerbell: JACS 57, pp. 2364–8 (1935).
Summerbell: JACS 61, pp. 3016–22 (1939).
Lappin et al.: JACS 70, p. 2600 (1948).
Madelung et al.: Annalen 526, pp. 195–251 (1936).